May 5, 1931. J. C. KARNES 1,803,939
ANTIAIRCRAFT SIGHT
Filed Feb. 26, 1927
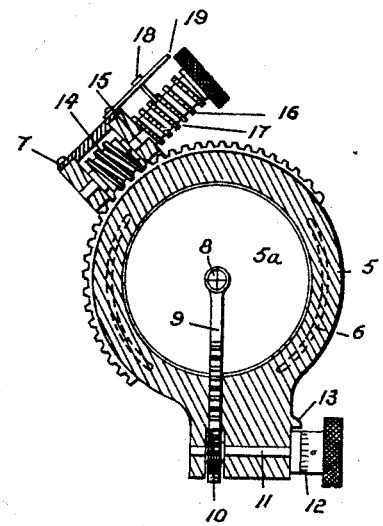
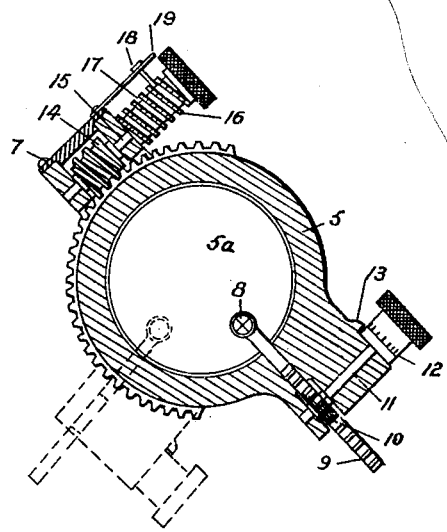
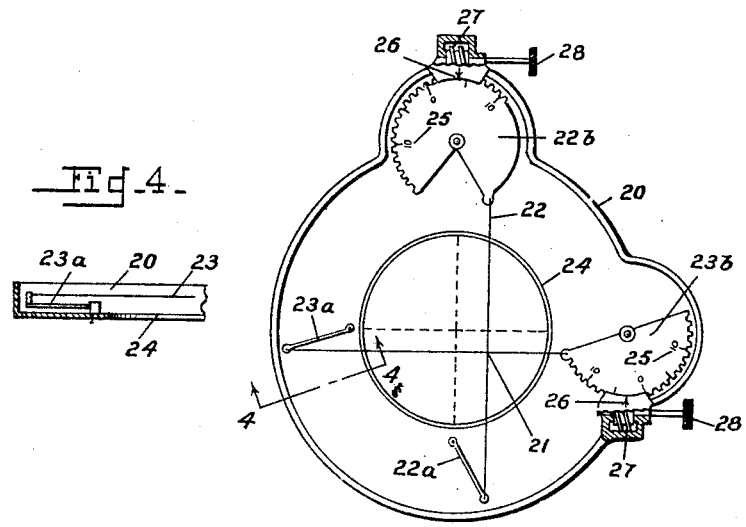
Inventor
James C. Karnes
By W. N. Roach
Attorney

Patented May 5, 1931

1,803,939

UNITED STATES PATENT OFFICE

JAMES C. KARNES, OF BUFFALO, NEW YORK

ANTIAIRCRAFT SIGHT

Application filed February 26, 1927. Serial No. 171,354.

(GRANTED UNDER THE ACT OF MARCH 3, 1883, AS AMENDED APRIL 30, 1928; 370 O. G. 757)

The invention described herein may be manufactured and used by or for the Government for governmental purposes without the payment to me of any royalty thereon.

The subject of this invention is an antiaircraft sight.

The principal object of the present invention is to provide novel means for displacing a gun sight amounts corresponding to the vertical and horizontal lead to be given the gun.

With the foregoing and other objects in view, my invention resides in the novel arrangement and combination of parts and in the details of construction hereinafter described and claimed, it being understood that changes in the precise embodiment of the invention herein disclosed may be made without departing from the spirit of the invention.

A practical embodiment of the invention is illustrated in the accompanying drawings, wherein:

Fig. 1 is a transverse sectional view showing a sight constructed in accordance with the invention;

Fig. 2 is a similar view showing the aiming point displaced;

Fig. 3 is a view in elevation of a modified sight;

Fig. 4 is a sectional view on the line 4—4 of Fig. 3.

Referring to the drawings by numerals of reference:

The sight shown in Figs. 1 and 2 consists of a frame 5 having a sight opening 5a and arranged to be supported in any convenient manner for rotatable movement. For this purpose it may be provided with grooves or with tongues indicated at 6 and engageable by a complementary portion of a fixed member, a portion of which is shown at 7. The fixed member is to be secured to the gun and is either in the form of a telescope or a front or rear sight bracket.

A mark 6 which may be in the form of cross hairs is used for indicating the point of aim and is placed on the extremity of a rack 9 mounted in the frame and movable radially by means of a pinion 10 on a shaft 11 which is also mounted in the frame. The mark 8 when in exact center of the frame is coincident with the optical center of the telescope so that the line of sight will be parallel to the axis of bore of the gun. Movement of the rack in a radial direction therefore displaces the mark or aiming point to allow for vertical lead to be given the gun and such displacement may be measured by means of a scale 12 inscribed on a collar on the shaft 11 and readable against a fixed index 13 on the frame 5.

Displacement of the aiming point 8 to apply the lateral correction corresponding to horizontal lead is made by bodily rotation of the frame through the worm 14 which is on a shaft 15 mounted in the fixed member 7. Displacement is measured by means of a scale 16 fixed to the shaft 15 and formed with spiral grooves 17 in which a pointer 18 engages. This pointer is carried in a slotted bar 19 secured to the member 7.

Sufficient movement of the frame and rack 9 is permitted to place the aiming mark at any point in the lower half of the field and the scale 16 accordingly bears inscriptions of different characteristics, preferably one being red and the other black, in order to distinguish between the two quadrants in which the aiming point is moved thereby allowing for direction of travel of the target. A "coming" or "going" target will require no lateral deflection in the line of aim.

In the form of device shown in Fig. 3 the sight consists of a casing 20 adapted to be fixed to the gun. The point of aim 21 is to be determined by the intersection of crosswires 22—23 arranged to be moved vertically and horizontally through a system of parallel links, the links 22a—23a being in the form of bars or rods and the links 22b—23b consisting of geared segments. These links are pivoted to the casing on the horizontal and vertical axes of the sight opening 24 in the casing. If desired, the pivotal attachment of the links to the casing may be joined by cross wires 22c—23c to establish by their intersection a point marking the normal line of sight parallel to the axis of bore.

The segments 22b—23b are provided with scales 25 readable against the index 26 for respectively indicating the displacement of the cross wires 22—23 in the horizontal and vertical planes. The segments are actuated by means of a worm 27 on a shaft 28.

Since only the lower half of the field is to be used the vertical wire 22 must be arranged for a greater amount of movement than the horizontal wire and accordingly the segment 22c is larger.

While I have shown the elements of the sight as being manually operated it is to be understood that they may be actuated by an electrical system of control associated with a remote computing device.

I claim:

1. A sight for guns including a body having a sight opening, a member mounted in the body for movement radially of the sight opening, an aiming point on the inner extremity of the member and disposed within the sight opening, means for moving the member and amount corresponding to the vertical lead to be given a gun and means for rotating the body whereby the member is displaced an amount corresponding to horizontal lead to be given the gun.

2. A sight including a support, a frame defining a field view mounted by said support for rotational movement in a plane perpendicular to a line of sight and an aiming point member mounted in said frame for movement radially with respect to the center of the field of view.

3. A sight including a body member having a sight opening, an aiming point member mounted for radial movement with respect to the center of the sight opening, means for measuring the amount of radial movement, means for moving the aiming point member circularly about the center of the sight opening and means for measuring the amount of circular movement.

4. A sight including a body member having a sight opening, an aiming point member mounted within the body member for movement in a single plane transversely of said member, means for moving the aiming point member radially with respect to the optical axis and means for moving it circumferentially about said axis in said transverse plane.

JAMES C. KARNES.